United States Patent
Sander

(10) Patent No.: US 7,586,675 B2
(45) Date of Patent: Sep. 8, 2009

(54) OPTICAL DEVICE WITH INCREASED DEPTH OF FIELD

(75) Inventor: Ulrich Sander, Rebstein (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 400 days.

(21) Appl. No.: 11/458,116

(22) Filed: Jul. 18, 2006

(65) Prior Publication Data

US 2007/0017993 A1 Jan. 25, 2007

(30) Foreign Application Priority Data

Jul. 20, 2005 (DE) ......... 10 2005 033 922
Aug. 3, 2005 (DE) ......... 10 2005 036 486

(51) Int. Cl.
*G02B 21/00* (2006.01)

(52) U.S. Cl. ............ 359/379; 359/368; 359/377

(58) Field of Classification Search ......... 359/368–390, 359/558–590

See application file for complete search history.

(56) References Cited

U.S. PATENT DOCUMENTS

| 4,412,127 | A | * | 10/1983 | Imai ............. 250/204 |
| 5,446,565 | A | * | 8/1995 | Komma et al. ......... 369/44.23 |
| 5,565,668 | A | * | 10/1996 | Reddersen et al. ..... 235/462.22 |
| 5,896,223 | A | | 4/1999 | Tigliev et al. |
| 6,330,118 | B1 | * | 12/2001 | Daschner et al. ........... 359/721 |
| 7,366,394 | B2 | * | 4/2008 | Takamatsu et al. ......... 385/147 |

FOREIGN PATENT DOCUMENTS

JP 2004-219987 * 8/2004 ............. 385/147

OTHER PUBLICATIONS

Leica Ag; Leica M651/M690; Manual and Zoom Surgical Microscopes For All Microsurgical Disciplines; 1995; 15 pages.

* cited by examiner

*Primary Examiner*—Thong Nguyen
(74) *Attorney, Agent, or Firm*—Hodgson Russ LLP

(57) ABSTRACT

The invention relates to an optical device (500) with a device (600) for increasing the depth of field having at least one optical element (3) with different focal lengths ($f_1$, $f_2$).

17 Claims, 5 Drawing Sheets

OPTICAL DEVICE WITH INCREASED DEPTH OF FIELD

CROSS REFERENCE TO RELATED APPLICATIONS

This application claims priority of German patent application no. 10 2005 033 922.0 filed Jul. 20, 2005 and of German patent application no. 10 2005 036 486.1 filed Aug. 3, 2005, which are both incorporated by reference herein.

FIELD OF THE INVENTION

The invention relates to an optical device, in particular to a stereomicroscope, having means for increasing the depth of field when viewing an object field.

BACKGROUND OF THE INVENTION

Microscopes comprise at least two imaging optical systems, one main objective and an eyepiece. In principle, all optical observation devices have the same fundamental structure of objective and eyepiece. These two optical elements, objective and eyepiece, form a total system and predefine both the possible magnification range and the field depth range. In many areas where microscopes are used, in particular surgical microscopes such as those used in neurosurgery, a very high degree of depth of field is important, because the surgeon has to see not only the focusing plane, but also as many regions of the object as possible in a range of sharp focus.

Improvement of depth of field is traditionally achieved by decreasing the size of the aperture. There are stereomicroscopes, such as the LEICA M651 and LEICA M690 (brochure LEICA M651/M690 X.96-SCH 1995, page 6), which provide a double iris diaphragm for simultaneously decreasing the aperture of both beam paths. The disadvantage that has to be accepted with this traditional way of improving the depth of field, however, is the loss in terms of resolution and image brightness.

A further, albeit technically very complicated increase in depth of field is known from EP-B1-0988572. Here, provision is made for a device which modifies the focal length of the system at very high speed. This is done either by displacing a lens longitudinally with respect to the beam path or by placing a lens having different optical properties transversely into the beam path. A shutter opens the beam path in cyclic fashion in relation to this movement only when the movement has reached its outermost point and briefly comes to a halt. The speed of this movement must be sufficiently high for so-called "stereoscopic pumping" (image movement) and brightness flicker not to occur.

Quite apart from the very high technical outlay mentioned, this solution is not practical in microscopes, if only for weight and space reasons.

SUMMARY OF THE INVENTION

The object was thus to find a solution for improving the depth of field in an optical device, in particular in a microscope, without the disadvantages of the known solutions for improving the depth of field occurring.

The inventor recognized that, in order to achieve the object, the mechanical part, the iris diaphragm, can be replaced by an optically imaging element. The inventor recognized that it is possible to improve the depth of field in an optical device (e.g. in a microscope) by means of a single optical element having a plurality of (that is to say at least two) different focal lengths.

In accordance with the invention it is possible to use bifocal lenses, multifocal lenses or diffractive elements for this purpose.

Bifocal lenses, or "dual-magnification lenses", are lenses having regions of two different focal lengths and are used in spectacle lenses, for example.

Progressive lenses, in which two or more regions having different focal lengths are joined by transition zones having continuously changing focal length, that is to say without sharp or stepped transition, are suitable as further embodiment variant.

A further embodiment variant can be achieved by means of producing different focal lengths with a freeform surface lens as well.

Diffractive optical elements (DOE) are also suitable, as further embodiment variant mentioned above, for producing different focal lengths. In general, these are elements which have, on their optical surfaces or a layer, structures or gratings of the order of magnitude of the optical wavelength.

Use of lenses achieving the different focal length ranges through a combination of the properties described is also conceivable. By way of example, use of lenses having refractive properties for one focal length and diffractive properties for another focal length is possible.

What is common to all the optical elements mentioned is that they focus the transmitted light in two or more focal lengths. The common mode of action according to the invention is thus illustrated schematically for all the abovementioned optical elements by way of example on the basis of a bifocal lens.

Further embodiments of the invention emerge from the figures and the dependent patent claims. The list of reference symbols is part of the disclosure.

BRIEF DESCRIPTION OF THE DRAWING VIEWS

Details of the invention are explained symbolically and by way of example with reference to figures. The figures are described coherently and comprehensively. Identical reference symbols denote identical components, and reference symbols with different indices denote parts that perform the same function or are similar.

DETAILED DESCRIPTION OF THE INVENTION

Figure 1:
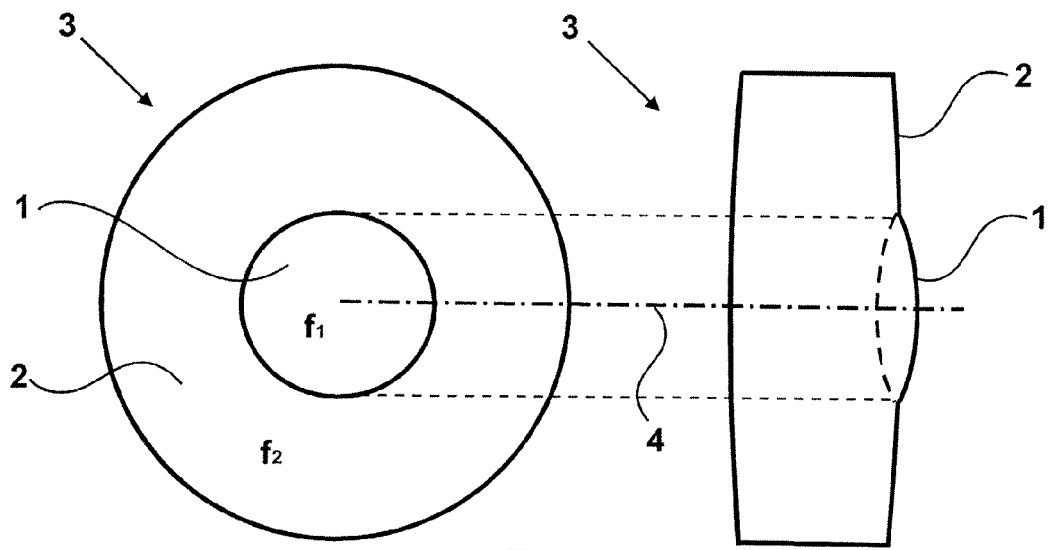
FIG. 1 shows a plan view and a side view of an optical element with different focal lengths used in accordance with the invention.

FIG. 1 schematically shows a bifocal lens 3 as an optical element with different focal lengths used in accordance with the invention. This bifocal lens 3 has a central first region 1 with a first focal length $f_1$, which region is arranged centrically with respect to the axis 4. A further, second region 2 with a second focal length $f_2$ different from the focal length $f_1$ is arranged concentrically with respect to said central first region 1 with a first focal length $f_1$. The concentric arrangement of regions 1 and 2 is not, however, necessary. As will be seen in further figures, a decentric arrangement of the first region 1 is likewise possible. The first region 1 and the second region 2 are depicted as delimited from one another by means of a contour, although a preferred type of lens envisages a continuous transition rather than a sharp contour in order to avoid a discontinuous transition from one focal length to the other.

Multifocal lenses which can be used in accordance with the invention have correspondingly more regions with different focal lengths, which regions may also be arranged concentrically or decentrically.

Figure 2:
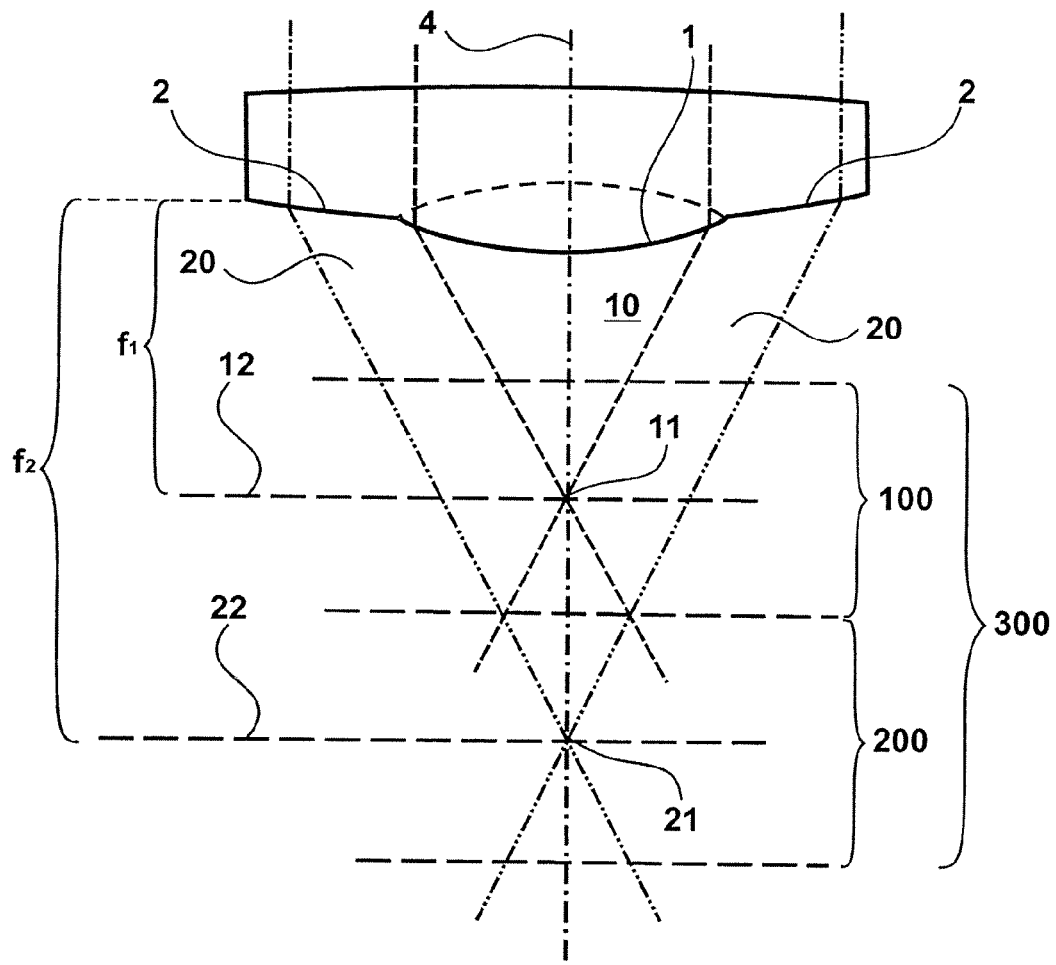
FIG. 2 shows the beam paths resulting therefrom in the focus range.

FIG. 2 shows the focussing ranges of an optical element 3 according to FIG. 1. It shows, by way of example, the way in which light beams 10, 20 traverse the corresponding regions 1 and 2 with focal lengths $f_1$ and $f_2$. Corresponding focal points 11 and 21 lie in different focal planes 12 and 22. Image planes which are still imaged in a sharp manner by region 1 and thus define a first field depth range 100 for region 1 are situated above and below the focal plane 12. The same applies in a corresponding fashion to region 2, the focal point 21 of which is situated in the focal plane 22 and defines a second field depth range 200. The total field depth range of the optical element 3 with different focal lengths $f_1$ and $f_2$ is the sum 300 of the field depth ranges 100 and 200.

In the embodiment depicted, the focal lengths $f_1$ and $f_2$ of the optical element 3 are selected such that the first field depth range 100 and the second field depth range 200 adjoin one another. It is, however, also possible in the same manner for the field depth ranges 100 and 200 to overlap. It is preferred here to design the optical element 3 with different focal lengths $f_1$ and $f_2$ such that the difference value of optical element 3 between the focal lengths $f_1$ and $f_2$ is selected to be sufficiently small for the occurring difference in magnification not to play a noticeable role.

Figure 5:
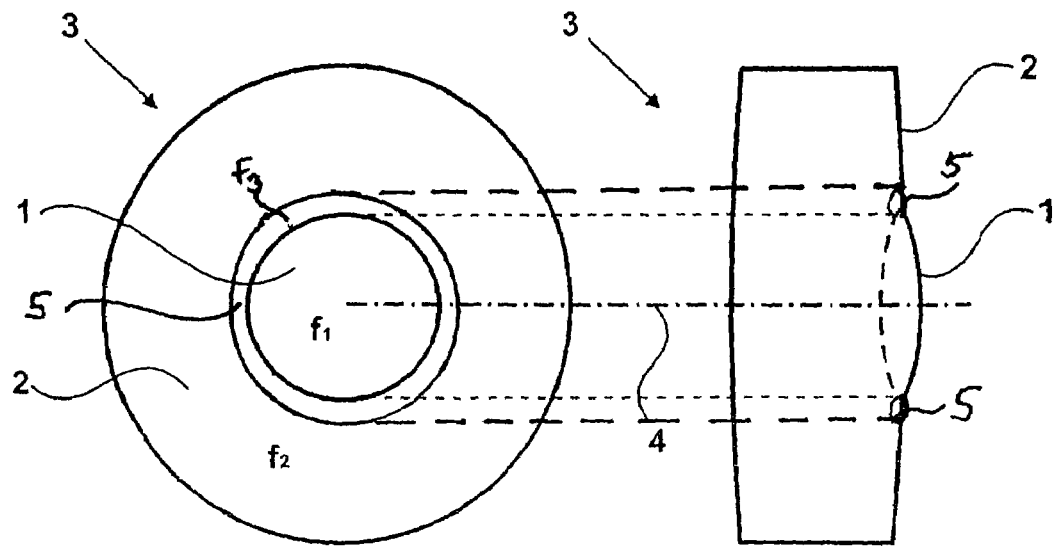
FIG. 5 shows a composite plan view and side view of an optical element with three different focal lengths (trifocal lens) used in accordance with the invention.

FIG. 5 shows schematically a trifocal lens 3 as an optical element with three different focal lengths used in accordance with the invention. This trifocal lens 3 has a central region 1 with a first focal length f1, which region is arranged centrically with respect to the axis 4. A further, second region 2 with a second focal length f2 different from the focal length f1 is arranged concentrically with respect to said central first region 1 with a first focal length f1. Between regions 1 and 2 is arranged a third region 5 with a focal length f3 which is different from both f1 and f2.

Figure 6:
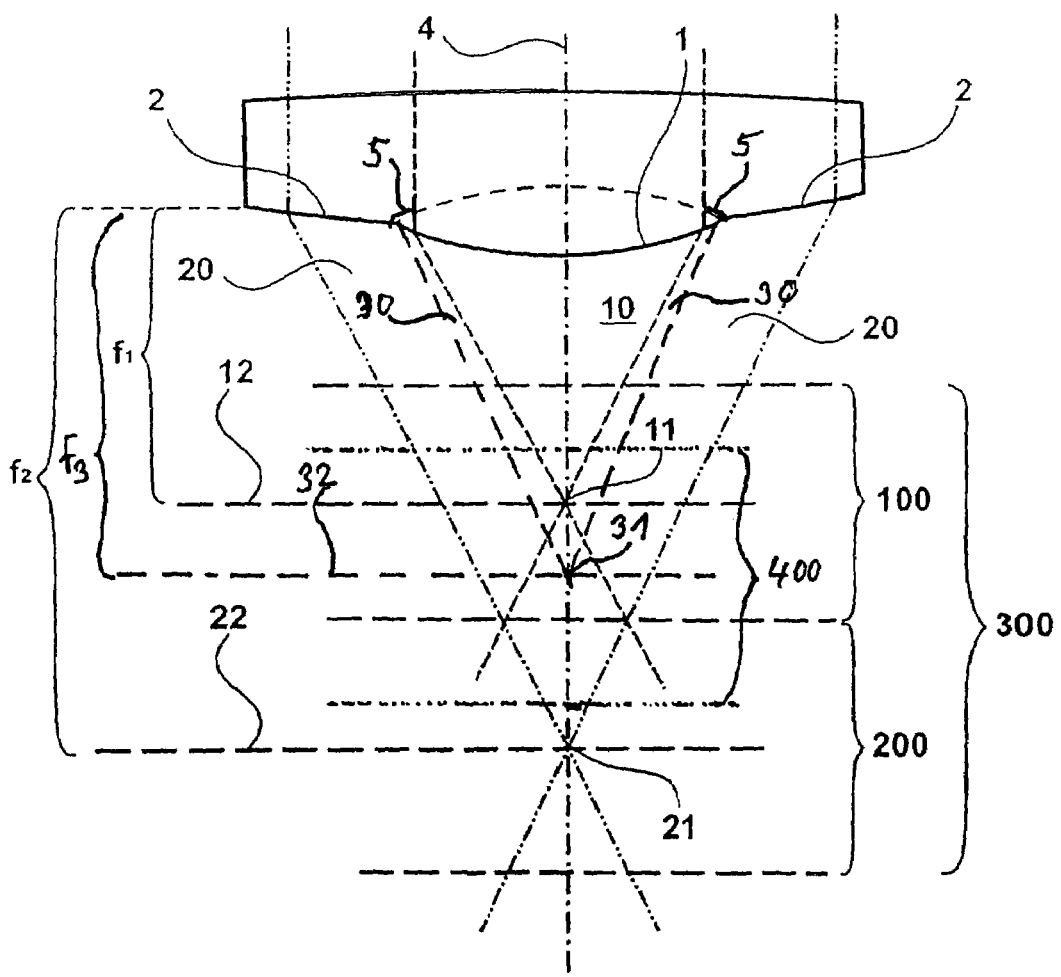
FIG. 6 shows the beam paths resulting from the optical element of FIG. 5 in the focus range.

FIG. 6 shows the focusing ranges of an optical element 3 according to FIG. 5. It shows, by way of example, the way in which light beams 10, 20, 30 traverse the corresponding regions 1, 2 and 5 with focal lengths f1, f2, and f3. Corresponding focal points 11, 21 and 31 lie in different focal planes 12, 22 and 32. Image planes which are still imaged in a sharp manner by region 1 and thus define a first field depth range 100 for region 1 are situated above and below the focal plane 12. The same applies in a corresponding fashion to region 2, the focal point 21 of which is situated in the focal plane 22 and defines a second field depth range 200. The same also applies in a corresponding fashion to region 5, the focal point 31 of which is situated in the focal plane 32 and defines a third field depth range 400.

The known methods of increasing the depth of field in optical devices (in particular closing the aperture by means of an iris diaphragm) have the disadvantage that resolution, image brightness and contrast decrease. In the method described here, too, the same disadvantage occurs, but to a lesser extent. Moreover, the total brightness capacity in the optical device is always decreased, in principle, in optical devices into which a further, additional optical element is placed. This loss in brightness, however, is again less than when closing the aperture. It is not possible to prevent these disadvantages from occurring, since the respective effective pupils are smaller with regard to the respective focal lengths than the effective area of an optical element 3 designed for a single focal length $f_1$.

Figure 3:
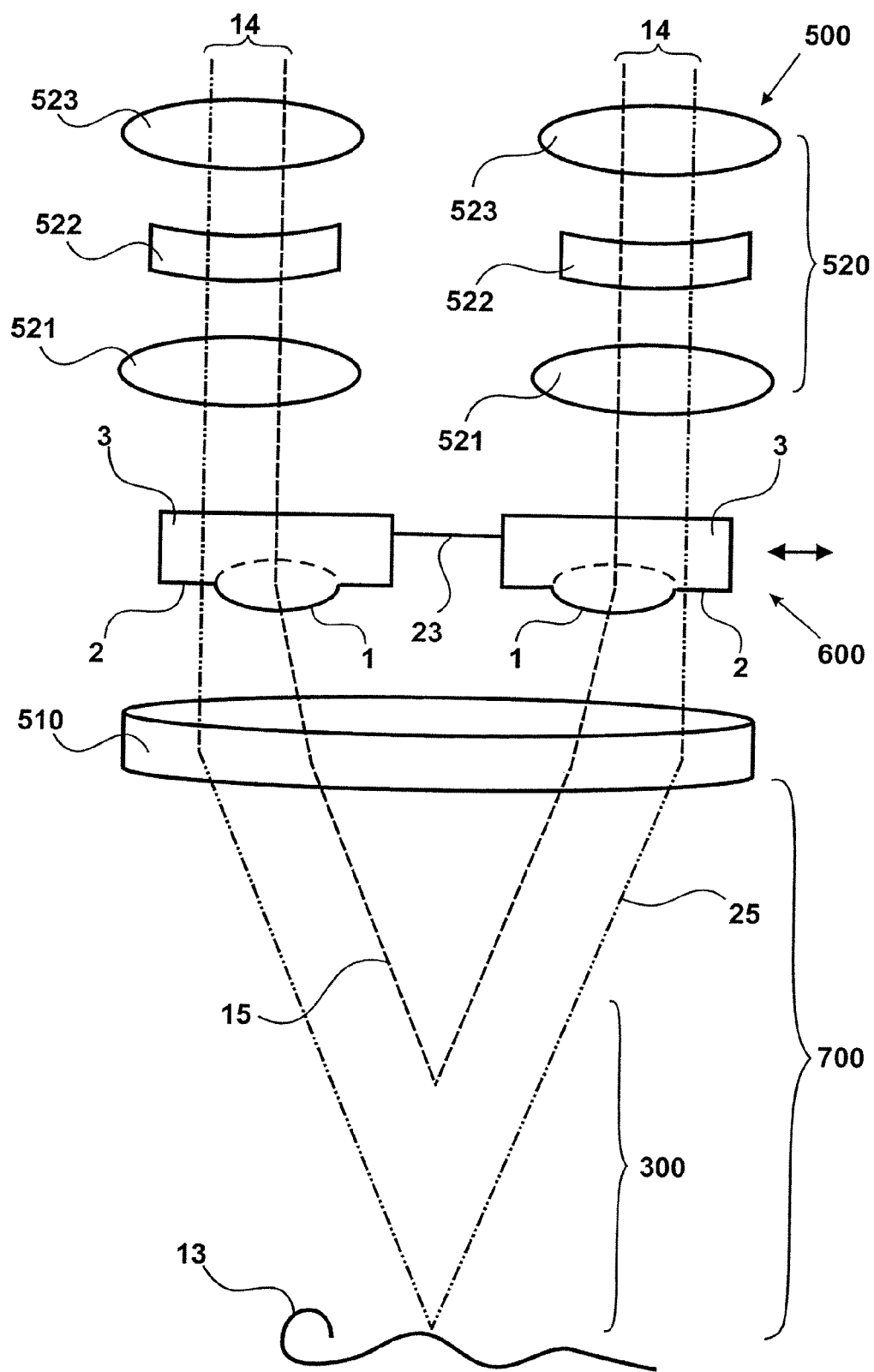
FIG. 3 shows the beam paths, produced in accordance with the invention by means of optical elements with concentrically arranged regions of different focal lengths, in a stereomicroscope.
Figure 7:
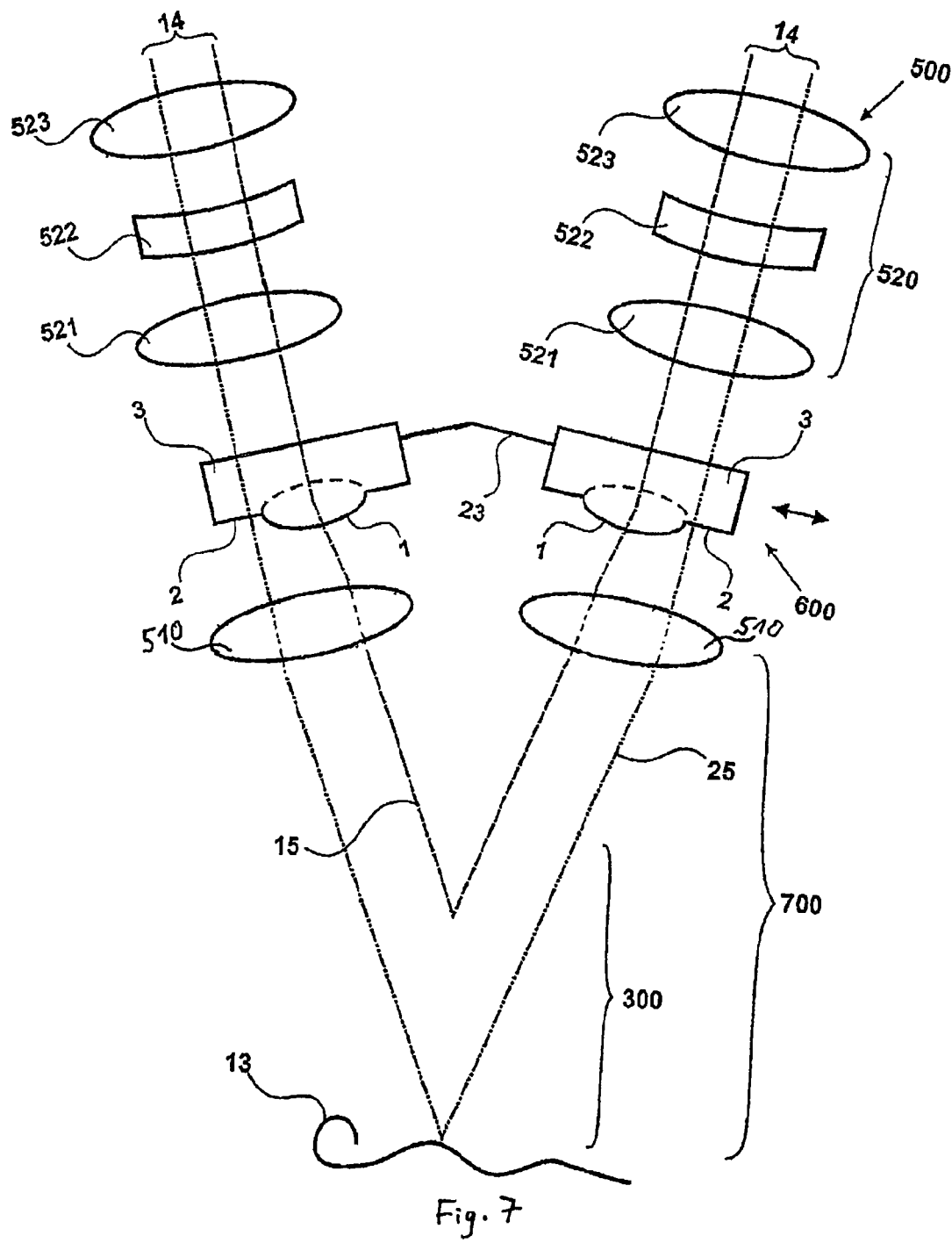
FIG. 7 shows the beam paths, produced in accordance with the invention by means of optical elements with concentrically arranged regions of different focal lengths in a stereomicroscope provided as a Greenough type.

FIG. 3 schematically depicts a part of a Galilean stereomicroscope 500 (so-called telescope type, with a common main objective for both microscope beam paths). Use of optical elements with different focal lengths for increasing the depth of field according to the invention is likewise suitable for stereomicroscopes of the Greenough type (having a single objective for each of the microscope beam paths), as shown in FIG. 7.

The stereomicroscope has a main objective 510, which defines two parallel beam paths 14. An afocal zoom system 520 is furthermore depicted, which zoom system 520 comprises a first zoom lens 521 arranged in pairs and zoom lenses 522 and 523 which are likewise arranged in pairs. The remaining structure of a stereomicroscope with tube lenses and eyepieces is not depicted in more detail, since it does not deviate from the general knowledge of the person skilled in the art in the field of microscope design.

A pair of optical elements 3 with different focal lengths $f_1$ and $f_2$ is preferably arranged between the main objective 510 and the first zoom lens 521 in the parallel beam paths 14 of the stereomicroscope 500. The two optical elements 3 with different focal lengths $f_1$ and $f_2$ correspond to those shown in FIG. 1 and have concentrically arranged regions 1 and 2. The two optical elements 3 with different focal lengths $f_1$ and $f_2$ are coupled to each other by means of a connecting piece 23 and can be moved simultaneously into the two beam paths 14 of the microscope 500. As a result, image planes situated above the object 13 and within the field depth range 300 are fed to a main objective 5 10 by means of the light beams 10 and 20 and imaged to infinity by means of the afocal zoom system 520. This image is fed to the viewer by means of the tube and eyepiece lenses (not illustrated).

The light beams 10 and 20 from FIG. 2 are shown symbolically by means of their axes 15 and 25, respectively, in FIG. 3. The main objective 510 and the regions 1 and 2 of the optical elements 3 are selected and arranged such that the respective light beams, characterized by their axes 15 and 25, are aligned in parallel fashion in the beam paths 14. Parallel alignment of the beam paths is necessary on account of the afocal nature of the zoom system 520. If diffractive elements are used as elements with multifocal properties according to the invention, this parallel alignment of the beam paths can be achieved for example by means of a blaze angle or in a traditional way by means of beam-deflecting systems of lenses or prisms.

Region 2 of the optical element 3 with multifocal properties can also be configured as a plane-parallel plate.

Figure 4:
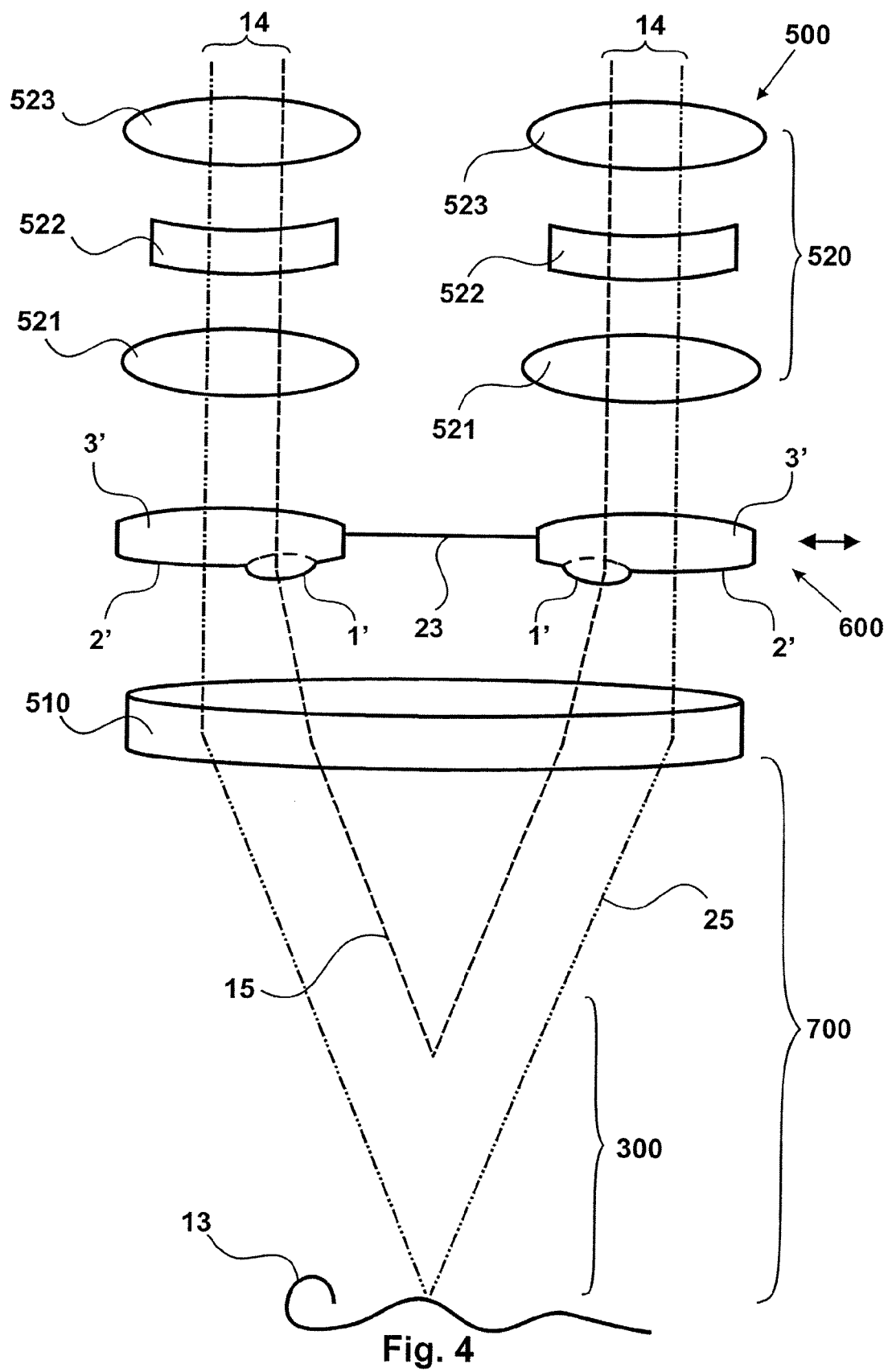
FIG. 4 shows the stereomicroscope from FIG. 3 with optical elements having decentrically arranged regions of different focal lengths.

FIG. 4 shows the same arrangement of a stereomicroscope 500 as in FIG. 3, except that now the optical elements 3 with multifocal properties no longer have two concentric regions 1 and 2 with different focal lengths $f_1$ and $f_2$. Regions 1' and 2' are arranged in a decentric and mirror-symmetrical manner.

In embodiment variants in which diffractive elements (for example made of plastic) are used as optical elements 3 with multifocal properties, as shown in FIG. 1 and 3 or 4, these diffractive elements can also be connected directly for example with lenses 521. In this case, the illustrated, removable elements 3 and 3', respectively, can be dispensed with.

LIST OF REFERENCE SYMBOLS

1—first region with a first focal length $f_1$
2—second region with a second focal length $f_2$
3—optical element with different focal lengths $f_1$ and $f_2$ (and $f_3$, see FIGS. 5, 6)
4—axis of 3
5—third region with a third focal length $f_3$
30—light beam with respect to region 5
31—focal point of 30
32—focal plane of 30
10—light beam with respect to region 1
11—focal point of 10
12—focal plane of 10
13—object
14—beam path
15—axis of 10
20—light beam with respect to region 2
21—focal point of 20
22—focal plane of 20
23—connecting piece
25—axis of 20
100—depth of field of region 1; first field depth range
200—depth of field of region 2; second field depth range
300—depth of field across all regions
400—depth of field of region 5; third field depth range
500—stereomicroscope
510—main objective
520—afocal zoom system
521—first zoom lens
522—zoom lens
523—zoom lens
600—device for increasing the depth of field
700—working distance
$f_1$—focal length of region 1
$f_2$—focal length of region 2
$f_3$—focal length of region 5

What is claimed is:

1. A surgical stereomicroscope having a pair of beam paths, the surgical stereomicroscope comprising:
at least one main objective for imaging an object observed by the stereomicroscope; and
at least one optical element increasing a depth of field of the surgical stereomicroscope while the at least one optical element is stationary, the at least one optical element including at least a first region having a first focal length and a second region having a second focal length which differs from the first focal length, the first region focusing a light beam into a first focal point and providing a first field depth range, and the second region simultaneously focusing a light beam into a second focal point and providing a second field depth range, wherein the first field depth range and the second field depth range adjoin to overlap one another to form a continuous total field depth range, and wherein the at least one optical element includes a pair of optical elements positioned one in each of the pair of beam paths of the stereomicroscope.

2. The surgical stereomicroscope according to claim 1, wherein the at least one optical element includes a refractive optical element.

3. The surgical stereomicroscope according to claim 2, wherein the at least one optical element includes a multifocal lens.

4. The surgical stereomicroscope according to claim 3, wherein the at least one optical element includes a bifocal lens.

5. The surgical stereomicroscope according to claim 3, wherein the at least one optical element includes a trifocal lens.

6. The surgical stereomicroscope according to claim 3, wherein the at least one optical element includes a freeform surface lens.

7. The surgical stereomicroscope according to claim 1, wherein the at least one optical element includes a diffractive optical element (DOE).

8. The surgical stereomicroscope according to claim 7, wherein the at least one optical element includes a holographic optical element (HOE).

9. The surgical stereomicroscope according to claim 1, wherein the at least one optical element includes an optical element that produces the first focal length by refraction and the second focal length by diffraction.

10. The surgical stereomicroscope according to claim 1, wherein the first region and the second region are concentric.

11. The surgical stereomicroscope according to claim 1, wherein the first region and the second region are decentric.

12. The surgical stereomicroscope according to claim 1, wherein the continuous total field depth range is larger than the first field depth range and is larger than the second field depth range.

13. The surgical stereomicroscope according to claim 1, wherein the stereomicroscope is of a Galilean type.

14. The surgical stereomicroscope according to claim 1, wherein the stereomicroscope is of a Greenough type.

15. The surgical stereomicroscope according to claim 1, wherein each of the pair of optical elements is configured to provide parallel light along its respective beam path in a direction of a viewer.

16. The surgical stereomicroscope according to claim 1, wherein each of the pair of optical elements is a diffractive optical element having a blaze angle chosen to provide the parallel light.

17. The surgical stereomicroscope according to claim 1, wherein each of the pair of optical elements is a refractive optical element deflecting its respective beam to provide the parallel light.

* * * * *